US010466419B2

(12) United States Patent
Missinne et al.

(10) Patent No.: US 10,466,419 B2
(45) Date of Patent: Nov. 5, 2019

(54) OPTICAL COUPLING OF EMBEDDED OPTICAL FIBERS

(71) Applicants: Com&Sens, Zwijnaarde (BE); IMEC VZW, Leuven (BE); Universiteit Gent, Ghent (BE)

(72) Inventors: Jeroen Missinne, Ghent (BE); Geert Van Steenberge, Sint-Amandsberg (BE); Geert Luyckx, Leuven (BE); Eli Voet, Leuven (BE)

(73) Assignees: COMS&SENS, Zwijnaarde (BE); IMEC VZW, Leuven (BE); UNIVERSITEIT GENT, Ghent (DE)

( * ) Notice: Subject to any disclaimer, the term of this patent is extended or adjusted under 35 U.S.C. 154(b) by 0 days.

(21) Appl. No.: 15/656,737

(22) Filed: Jul. 21, 2017

(65) Prior Publication Data
US 2018/0024295 A1    Jan. 25, 2018

(30) Foreign Application Priority Data

Jul. 25, 2016  (EP) ..................................... 16180924

(51) Int. Cl.
 *G02B 6/26* (2006.01)
 *G02B 6/36* (2006.01)
(52) U.S. Cl.
 CPC ........... *G02B 6/262* (2013.01); *G02B 6/3616* (2013.01); *G02B 6/3644* (2013.01)
(58) Field of Classification Search
 CPC .................................... G02B 6/26; G02B 6/36
 USPC ......................................................... 385/38
 See application file for complete search history.

(56) References Cited

U.S. PATENT DOCUMENTS

| 4,717,253 | A | * | 1/1988 | Pratt, Jr. ................ G01B 11/16 356/32 |
| 8,622,625 | B2 | * | 1/2014 | Benjamin .......... G02B 6/02342 385/72 |
| 9,810,853 | B2 | * | 11/2017 | Kondo ................. G02B 6/3825 |
| 9,817,191 | B2 | * | 11/2017 | Kopp ........................ G02B 6/30 |
| 9,939,590 | B2 | * | 4/2018 | Gatnau Navarro .. G02B 6/3866 |
| 2002/0172470 | A1 | | 11/2002 | Johnson et al. |

(Continued)

FOREIGN PATENT DOCUMENTS

| DE | 10 2012 020 920 A1 | 5/2013 |
| EP | 1 503 231 A1 | 2/2005 |

(Continued)

OTHER PUBLICATIONS

European Search Report, European Patent Application No. 16180924.9, dated Jan. 19, 2017, 8 pages.

*Primary Examiner* — Kaveh C Kianni
(74) *Attorney, Agent, or Firm* — McDonnell Boehnen Hulbert & Berghoff LLP (57) ABSTRACT

An optical system and method for connecting two optical fibers is described in the present disclosure. An example optical system includes a first optical fiber embedded in an embedding material, the first optical fiber comprising side walls extending in a longitudinal direction in contact with the embedding material, a second, external, optical fiber, and a self-written waveguide in optical contact with the first and second optical fibers. Only a cross section perpendicular to the side walls of the first optical fiber is outside the embedding material, in contact with the self-written waveguide.

19 Claims, 4 Drawing Sheets

(56) References Cited

U.S. PATENT DOCUMENTS

| | | | |
|---|---|---|---|
| 2005/0259909 A1* | 11/2005 | Aldridge | G02B 6/3803 385/14 |
| 2005/0259919 A1* | 11/2005 | Aldridge | G02B 6/34 385/37 |
| 2005/0271336 A1* | 12/2005 | Galstian | G02B 6/122 385/95 |
| 2006/0045421 A1* | 3/2006 | Baets | G02B 6/4201 385/33 |
| 2007/0058388 A1* | 3/2007 | Takatori | G02B 6/001 362/554 |
| 2009/0285532 A1* | 11/2009 | Kagami | B29D 11/00663 385/45 |
| 2009/0324172 A1* | 12/2009 | Haga | G02B 6/125 385/42 |
| 2010/0001421 A1* | 1/2010 | Yonemura | G02B 6/138 264/1.27 |
| 2010/0104243 A1 | 4/2010 | Kewitsch | |
| 2016/0062039 A1* | 3/2016 | Zhang | G02B 6/305 385/14 |
| 2016/0072585 A1* | 3/2016 | Halderman | G02B 6/4204 398/141 |
| 2016/0077288 A1* | 3/2016 | Watte | G02B 6/3846 385/78 |
| 2017/0059791 A1* | 3/2017 | Missinne | G02B 6/30 |

FOREIGN PATENT DOCUMENTS

| | | |
|---|---|---|
| JP | 2006-317533 | 11/2006 |
| JP | 2010-32584 | 2/2010 |
| WO | 2015/126561 A1 | 8/2015 |

\* cited by examiner

OPTICAL COUPLING OF EMBEDDED OPTICAL FIBERS

CROSS-REFERENCE TO RELATED APPLICATIONS

The present application is a non-provisional patent application claiming priority to EP 16180924.9, filed Jul. 25, 2016, the contents of which are hereby incorporated by reference.

FIELD OF THE DISCLOSURE

The disclosure relates to the field of light guide devices. More specifically it relates to the field of interconnections of embedded optical fibers.

BACKGROUND

Embedding of fiber optic sensors in materials is a known technology to measure in-situ material deformations. In the ingress/egress strategy, one of the main problems is usually to find suitable methods for connecting this embedded fiber with an external fiber. Although several ingress/egress techniques exist, mainly based on feed through designs and external coupling, the resilience and strength of the coupling is not guaranteed.

Optical fiber sensors are normally spliced to a pigtail which connects the sensor with its read-out device. This typically needs some length of fiber, such as a few centimeters, starting from the edge of the composite. Composite structures are usually fabricated by moulding, in which cases embedding of optical fibers in composite laminates can be performed during fabrication. After fabrication and prior to use, trimming of the structure edges is often necessary. By trimming the edges, all fiber ingress points will be lost, and as a consequence splicing is very difficult or impossible to carry out when the fiber is broken at the edge of the composite.

A possible solution is avoiding cutting the fiber. For example, a connection may be provided in the waveguide embedded in the material during the fabrication. In case of composites, for example moulded composites, the solution is cumbersome. The embedded fiber in such system has restricted orientations and positions, and the production mould and established manufacture route needs to be adapted. The fiber is protected using Teflon or other types of tubing or Kapton foil. Sometimes the outcome of the fiber is protected with silicone. It is hardly possible to trim edges or remove mould burrs off the material. Other options include removing partially composite material, for example several layers on the side along the fiber, revealing a portion thereof, and then connecting the fiber in the revealed side. This is a cumbersome method, it requires a separate protective block for the fiber and the removed parts of the composite, and prior knowledge of the position of the fiber is necessary, or at least a reliable method to find it, which is not trivial in many cases.

Document DE102012020920A1 describes a method for connection of optical fibers used as optical sensors in e.g. automotive industry, involving embedding fiber in glass-fiber reinforced plastic, and turning front sides of ends of fibers towards each other. A portion of the embedding material, surrounding the fiber, is typically removed before an optical fiber ferrule and sleeve is used to align the embedded fiber with the external fiber. Finally, an arc is used to connect them. This method may damage the optical fiber and its cleave angle may introduce losses. These losses add up to the losses from splicing fibers, which take place especially in the usual case in which both fibers are different (e.g. one may be optimized for FBG sensing, while the other for signal transmission).

In the above discussed existing methods, there is no or very little room for repair or rework of a bad connection.

SUMMARY

It is an object of embodiments of the present disclosure to provide a reliable, non-invasive optical fiber connection between an embedded optical fiber and an external optical fiber with reduced or negligible losses.

In some embodiments of methods of the present disclosure coupling the optical fiber directly at the edge or composite surface is enabled, and it allows connection or repair of the connection at any time.

The present disclosure relates to an optical system comprising a first optical fiber embedded in an embedding material, the first optical fiber comprising side walls extending in a longitudinal direction in contact with the embedding material, a second, external, optical fiber, and a self-written waveguide in optical contact with the first and second optical fibers thus forming an optical connection between the first optical fiber and the second optical fiber, wherein only a cross section perpendicular to the side walls of the first optical fiber is outside the embedding material, in contact with the self-written waveguide. In some embodiments of the present disclosure easy manufacture and reparability are obtained. In some embodiments of the present disclosure accurate optical interconnection between two optical fibers is obtained.

The embedding material may be a composite. In some embodiments of the present disclosure a composite with embedded optical fiber can be obtained in a standard manufacturing process, without the need to introduce a connection during the process.

The system furthermore may comprise a strain relief element decoupling the stress acting on the second optical fiber from the optical connection. In some embodiments of the present disclosure no strain is induced on the self-written waveguide. In some embodiments a good attachment between the embedded optical fiber and an external optical fiber is provided, and a smooth optical transition between the two optical fibers is established, whereby coupling between different optical fibers can be obtained by providing a gradual conversion of the mode field diameter.

The optical system may further comprise a ferrule, a block, a connector, a base plate or a combination of these attached to the self-written waveguide. In some embodiments of the present disclosure a reinforcement of the external optical fiber, such as a reader fiber pigtail, is obtained. The connection may also easily and reliably be manufactured.

The ferrule may be adapted to cooperate with an external ferrule of a removable optical fiber, in order to provide optical contact between the second optical fiber and the removable fiber. In some embodiments of the present disclosure the connection may be detachable, allowing for example different readers to be connected to an embedded fiber sensor.

Both ferrules may have angled termination. For FBG sensors, angled connectors are used in some embodiments to avoid unwanted reflection. In case the connection is not detachable, the use of angled fibers/Ferrules is less important since the fiber facet is embedded in the SWW material which has an index close to that of the fibers. In case the connection is detachable, the detachable interface part needs to have an angled fiber facet to avoid reflection. This is the main advantage of using an angled surface. The optical fibers may be single mode optical fibers. In some embodiments of the present disclosure the connection may be aligned in an easy way.

The first optical fiber may be an optical fiber sensor for detecting deformations in the embedding material, and the second optical fiber may be an optical fiber adapted for information transmission. In some embodiments of the present disclosure damages and stress can be detected in a composite, such as a structural composite, during use, without the need of complex fabrication processes for embedding the sensor with connection in the composite.

The present disclosure also relates to a method for optically coupling an external optical fiber with an optical fiber embedded in an embedding material, thereby obtaining an optical system according to the present disclosure, the method comprising exposing an end-face of the embedded optical fiber without needing to expose the side walls of the optical fiber out of the embedding material, aligning an end-face of the external optical fiber with the exposed end-face of the embedded optical fiber, and providing an optical intermediate waveguide material between the end-faces of the two optical fibers, thereby obtaining a self-written waveguide between the embedded optical fiber and the external optical fiber.

In some embodiments of the present disclosure trimming is not required, obtaining a reliable and stable connection. In some embodiments two different waveguides may connect with minimum loss.

Aligning the exposed end-faces of the waveguides may comprise transmitting a signal through the external waveguide and measuring the difference in reflectivity between the end-face of the embedded optical fiber and the composite material, thus revealing the location of the embedded optical fiber. In some embodiments of the present disclosure good fine alignment can be obtained, ensuring maximum transmission between the optical fibers. The latter can be obtained without needing additional components and in reflection. The embedded optical fiber does not need to be connected.

Obtaining a self-written waveguide may comprise the steps of dispensing an optical polymer between the end-faces of the two optical fibers, forming the core of the self-written waveguide, and forming the cladding of the self-written waveguide. In some embodiments of the present disclosure good alignment of the core fibers can be obtained. In some embodiments a smooth, gradual match between mode field diameters (MFDs) of the embedded and the external optical fibers can be obtained.

Forming the core of the self-written waveguide may comprise transmitting an UV signal through the optical fibers and forming the cladding may comprise applying flood UV exposure to the optical polymer. In some embodiments of the present disclosure different degrees of curing can be reached in the SWW, allowing flexibility of optical index difference between the core and the cladding of the SWW, thus allowing tailoring the transmission between the external and embedded optical fibers.

Alignment may be performed with support of a base plate. In some embodiments of the present disclosure mechanical and thermal stability can be obtained, for example during manufacture, by use of a carbon and/or composite base plate.

Particular aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various aspects. This method of disclosure, however, is not to be interpreted as reflecting an intention that the claimed disclosure requires more features than are expressly recited in each claim. Rather, as the following claims reflect, some aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Where in embodiments of the present disclosure reference is made to "end-face" of an optical fiber, reference is made to the cross section of the optical fiber, usually perpendicular to the side walls, from which the radiation leaves the optical fiber. In cylindrical optical fibers, for example, the side walls comprise the cladding, and the end-faces of the fiber are the sections at the opposite extremes of the fiber, revealing the fiber core. If the end-face is oblique to the side walls, it receives the name of "cleaved end-face" due to the usual method of obtaining it.

In a first aspect, the present disclosure relates to an optical system providing a connection between two optical fibers, one of which is embedded in material such as a composite material, the other being an external optical fiber, by an intermediate waveguide providing adhesion and optical connection with low losses between the embedded optical fiber and the external optical fiber.

The embedded optical fiber is completely buried within the material, except for its end-face, which is in contact with the exterior via an aperture or window in the material. The surface of composite material may contain the surface of the end-face, giving a smooth transition between the two different surfaces with no bumps or depressions. The intermediate waveguide is made in contact with the end-face of the embedded optical fiber, it may also be in direct contact with the portion of the composite surrounding the optical fiber, and it is in contact with the external optical fiber.

The material serving as intermediate waveguide is an optical material, e.g. a self-written waveguide (SWW), e.g. with adhesive properties (optical adhesive, for example "NOA68"). Because the embedded optical fiber and the external optical fiber may be different, in some embodiments, the optical material may include roughly "average" properties of both optical fibers (average optical index, average mode field diameter (WD)). It was found that the SWW can act as a mode field diameter converter between two different optical fibers and therefore result in a lower loss than a simple butt-coupling connection of those 2 fibers.

A particular example of connection between a sensor (e.g. "DTG-sensor") fiber and an external standard telecom (e.g. "SW-28") fiber is explained by comparison with splicing. Because the optical properties of both fibers are different (e.g. the core diameter is different), the mode field diameter of the light travelling in both fibers is different which will result in an additional loss when simply splicing those fibers. The idea described here uses an intermediate (self-written) waveguide structure that acts as a mode field converter, thereby minimizing the theoretical achievable losses of the DTG-SW28 connection.

The external optical fiber is an optical fiber that is not embedded in the embedding material.

The connection of the present disclosure is highly reproducible, inexpensive, and simple. It does not require removal of composite walls or material which may reduce the durability of the composite.

According to one set of embodiments, the optical system furthermore comprises a mechanical connection between the composite material, directly or indirectly, and the external optical fiber, e.g. a pigtail of that optical fiber. The mechanical connection thereby is established in such a way that there is no direct force acting on the optical connection, e.g. on the self-written waveguide, thus decoupling mechanical and optical aspects.

Figure 1:
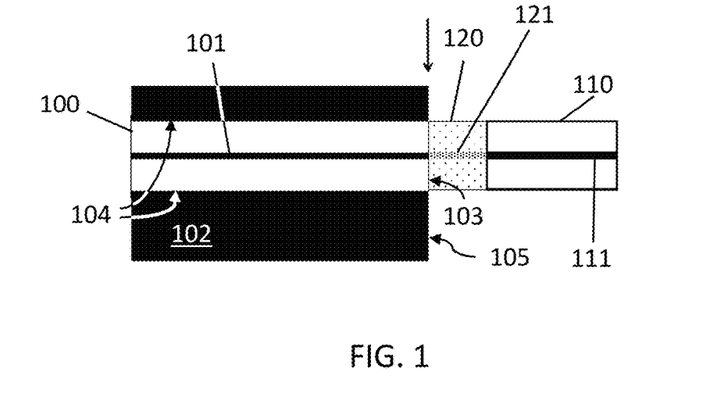
FIG. 1 illustrates a schematic simple embodiment of a connection between an embedded optical fiber and an external optical fiber, according to an example embodiment.

FIG. 1 shows a schematic cross-section of a simple connection according to an embodiment of the present disclosure. A first optical fiber 100 comprising a fiber core 101 is embedded in an embedding material 102. The optical fiber 100 is completely embedded in the material at the zone of the connection except for the end-face 103 of the optical fiber, the entirety of its side walls 104 being in contact with the embedding material 102. The end-face 103 of the embedded optical fiber 100 is shown in line with the surface 105 of the material 102. However, this is not essential in the present disclosure, and the optical fiber 100 may not be completely embedded in its whole length, just in a portion proximal to the end-face. For example, the extreme of the optical fiber 100 opposite to the end-face 103 may be outside the material, or some areas of the material may reveal the optical fiber. Additionally, a portion of the side walls 104 extending from the end-face 103 may be also revealed, slightly.

A second, external, optical fiber 110 is provided. An intermediate optical material 120 is fabricated in contact with the external optical fiber 110 and it is also provided at the end-face 103 of the embedded optical fiber 100. The intermediate optical material 120 is provided as a self-written waveguide 121. Thus, optical connection between the embedded optical fiber 100 and the external optical fiber 110 can be obtained without splicing.

The intermediate material 120 covers the totality of the end-face 103, but it may also extend over part of the surface 105 of the material 102. In some embodiments, the core 111 of the external optical fiber 110 and the core 101 of the embedded optical fiber 100 are optically aligned. The disclosure, however, is not limited to said configurations. According to embodiments of the present disclosure, the SWW 121 covers at least the core of the embedded optical fiber but may not cover the complete end-face of the embedded optical fiber.

In embodiments of the disclosure, the embedding material may be a composite such as a composite sheet, and the embedded optical fiber may be an optical fiber buried within and extending underneath the surface. The composite sheet has certain thickness, thus the sheet comprises at least a side surface (e.g. a border surface along the composite thickness), and the end-face of the optical fiber may be comprised in the side surface of the sheet. The optical fiber may comprise a sensor, such as a deformation sensor comprising a fiber Bragg grating (FBG), a sensor for detecting internal damage in the composite, etc.

The external optical fiber may be an optical fiber optimized for telecommunications. In embodiments of the present disclosure, it may be an optical fiber for providing a connection to a sensor reader (e.g. directly connected to a reader, or adapted in the system as a pigtailing fiber (or pigtail) for providing such connection to a sensor fiber, for example). In general, optical fibers for transmission to a reader and optical fibers for sensing may have different characteristics and standards. For example, the numerical aperture and cut-off wavelength of both optical fibers may be different. For example, the diameter of the core 101 of the embedded optical fiber 100 may differ from the diameter of the core 111 of the external optical fiber 110. In general, it can be said that the mode field diameter (MFD) of the embedded optical fiber 100 may be different from the MFD of the external optical fiber 110.

Embodiments of the present disclosure allow a smooth match between the different optical fibers, irrespective of their MFDs, through the intermediate optical material 120, which may be a self-written waveguide SWW. In the general case of mismatching MFDs, the SWW may offer MFD conversion, gradually adapting the MDC when the optical mode signal travels through the connection, improving the performance in comparison with other techniques such as fusion splice. For example, it may provide a gradual conversion, e.g. a linear conversion, or a step-wise conversion.

Figure 2:
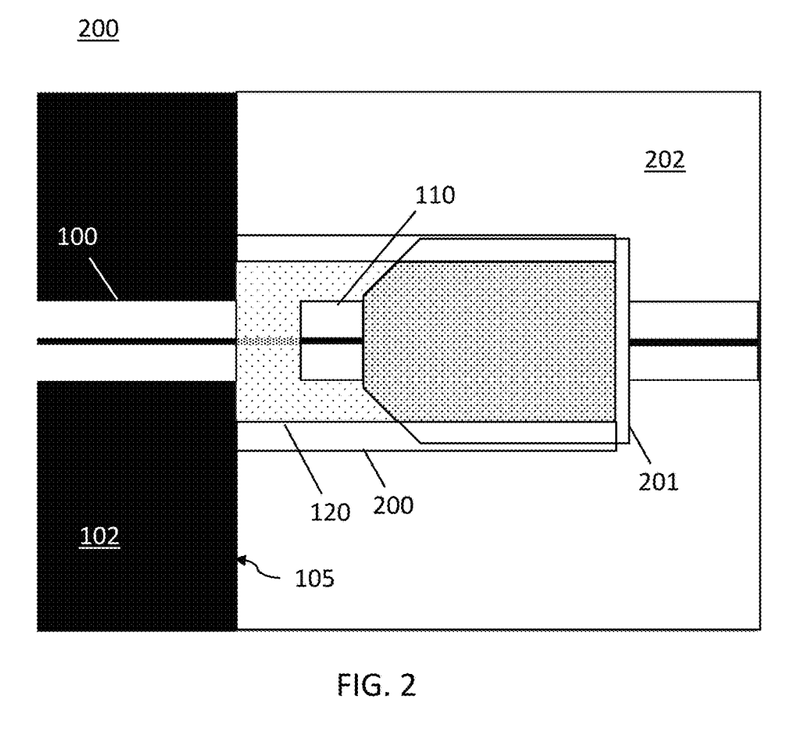
FIG. 2 illustrates a reinforced connection between an embedded optical fiber and an external optical fiber with a ferrule, according to an example embodiment.

FIG. 2 shows a schematic of a realistic implementation of the concept shown in FIG. 1, including the optical connection as well as a mechanical housing 202. The intermediate optical material 120, such as a SWW 121, extends over part of the surface 105 of a material 102 (e.g. a composite) comprising an embedded optical fiber 100, improving mechanical resilience and stability of the connection. Resilience may be further improved by the addition of an adhesive layer 200, which may have the same or different composition as the intermediate material 120 (e.g. the adhesive may comprise material suitable for a SWW 121, but it may also be other type of adhesive). A ferrule 201, for example a ceramic ferrule, is in contact with the external optical fiber, which may be an optical fiber "pigtail" 110. The ferrule 201 is mainly used for handling during connectorization. The ferrule 201 also provides mechanical resilience and support to the fiber pigtail 110, which may or may not stick out of the ferrule. A reinforcement housing 202 may be provided.

In embodiments of the present disclosure, the optical connection can be provided between single-mode optical fibers, although the present disclosure may also provide an optical connection between multi-mode or multi-core fibers.

In a second aspect, the present disclosure relates to a method for obtaining an optical connection according to embodiments of the first aspect of the present disclosure. The method may comprise providing SWW 121 in an egress and ingress method of optical transmission in an embedded optical fiber such as a fiber sensor. The method is suitable for optically coupling an external optical fiber (such as a fiber pigtail of a sensor reader) with an optical fiber embedded in an embedding material (such as the optical fiber of a deformation sensor in an embedding composite), and it may reduce coupling losses.

Figure 3:
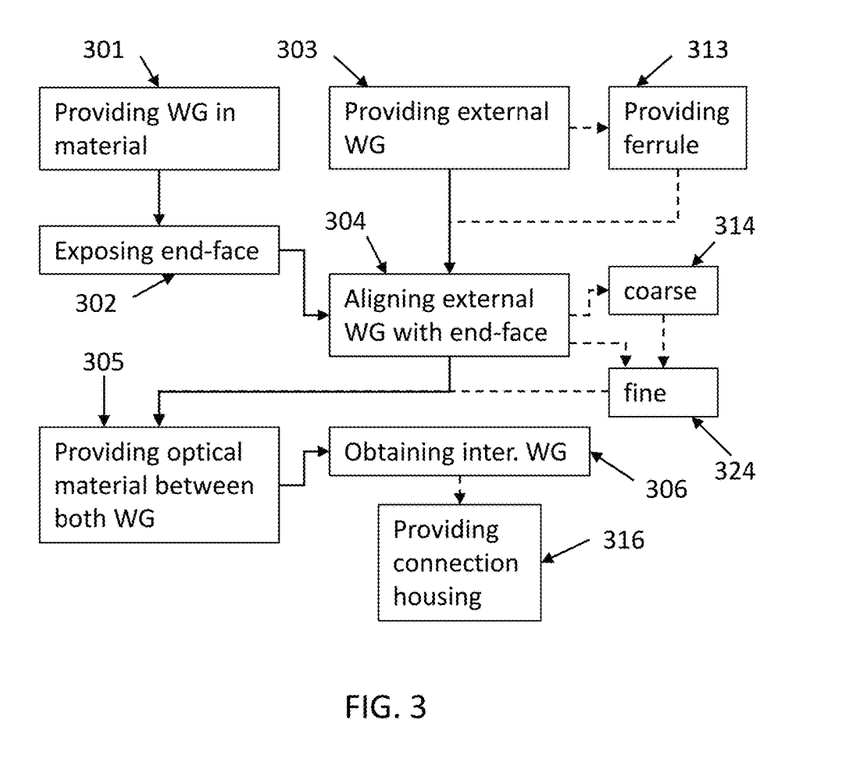
FIG. 3 shows a flowchart of the steps of an exemplary method for providing an optical connection, according to an example embodiment.

FIG. 3 shows a flowchart with the main steps (full lines) and optional steps (dashed lines) of the present method.

The step of providing 301 an optical fiber in a material may comprise embedding an optical fiber (e.g. a fiber sensor, such as a FBG sensor) in a composite material by placing the optical fiber in a mould, without any connectors, and curing the composite. The rest of the process comprises providing a connection (connectorizing) in the material. Other sub-steps such as trimming, removing burrs, and other treatments may be comprised in this step. The standard fabrication process of the material or composite does not need to be changed in order to provide connectors.

Once the optical fiber, also referred to as embedded optical fiber, is provided 301 in the material, a step of exposing 302 the end-face of the embedded optical fiber is provided. For example, a cut can be made in the composite after curing, for example using a diamond blade, exposing the end-face of the embedded fiber. Using a diamond blade means that little or no strain or damage is introduced in the optical fiber or the especially delicate fiber core. Other methods may be used, such as slicing the material with a microtome, removing material by grinding and/or polishing, etc. For example, the end-face may be revealed by grinding away material from the surface that will contain the connections (e.g. the edge of a composite), and then polishing the surface for obtaining a very smooth end-face surface with an undamaged fiber core revealed (for example, using $\frac{1}{2400}$ grain size grinder paper, or finer polishing). In some cases, no composite material needs to be removed at all (for example, if the fiber sticks out of the material and it can be cut so an end-face is exposed, for example).

The step of providing 303 an external optical fiber (for example an optical fiber, such as a pigtail suitable for a sensor reader) comprises providing an optical fiber with at least one end-face for receiving optical signals therein. For example, at least one end-face should be properly obtained with few or no defects. The method may further comprise the optional step of providing 313 a reinforcing ferrule, which may be attached to the pigtail, which optionally may stick out of the ferrule, for facilitating further connection with an external sensor, reader, fiber, etc. In embodiments comprising thin embedding materials, the ferrule may be a micro-ferrule. In some embodiments, a number of fibers may be used whereby instead of a ferrule e.g. a block with precise v-grooves can be used.

Once both optical fibers are obtained, the step of aligning 304 an end-face of the external optical fiber with the exposed end-face of the embedded optical fiber, so there is optical connection between the optical fibers, is provided. In case of optical fibers, the core 101, 111 of the optical fibers 100, 110 may be aligned with respect to each other, as shown in FIG. 1. Due to the small size of the optical fibers (usually less than 200 microns), this process is not trivial. Although the use of a camera may be an option, the embedded optical fiber may be difficult to see due to low contrast. This also has the disadvantage that an additional camera would be required. In general, the aligning 304 may comprise setting the external optical fiber at an appropriate distance (e.g. 50 microns) of the surface of the material, introducing a signal through one of the optical fibers and scanning the surface of the material with the external optical fiber, studying the signal detected in a detector attached to the external optical fiber. The present disclosure shows two exemplary methods of alignment, in transmission and in reflection.

For the method in transmission, in order to find an end-face of the optical fiber in the composite surface, a signal is introduced through the opposite side of the embedded optical fiber and the signal is searched on the surface. Specifically, if the embedded optical fiber is connectorized on the side opposite to the end-face 103 to be attached to the SWW, it can be connected to a laser source. The external optical fiber is then connected to a detector, and the surface of the composite is scanned. When the external optical fiber detects an intensity maximum, the external optical fiber and the embedded optical fiber are aligned.

For the method in reflection, the signal is introduced in the external optical fiber, illuminating the relevant portion of surface of the material in which the end-face of the embedded optical fiber is expected. The reflectivity of the composite and the end-face of the optical fiber are typically different, and can be known. Thus, the external optical fiber scans the surface, and once the maximum reflection typical from the embedded optical fiber is detected, the external and the embedded optical fibers are aligned.

The present disclosure may use one or another method, or may use a combination of both. For example, a method in reflection may be used for aligning a first end of an embedded optical fiber, connection between external and embedded optical fibers may be done and subsequently be used to align a second end of the embedded optical fiber.

Optionally, the alignment may comprise performing 314 coarse alignment and/or performing 324 fine alignment. Fine or micro alignment can be used for an optical fiber sensor (e.g. a fiber comprising a FBG), by scanning over the edge of the embedding material, as before. From the external optical fiber, a signal (e.g. broadband light) is launched, matching what is required for reading out the FBG sensor. The external optical fiber is now scanned over the edge of the composite material comprising the embedded optical fiber with FBG sensor, so that the highest reflection peak is obtained when both optical fibers are aligned. This technique is mainly suitable when both optical fibers are already slightly aligned, for example via a coarse alignment, and only require final fine scanning to exactly align both optical fibers.

For performing 314 the optional, coarse, alignment (e.g. over millimeter range) a faster technique can be used, in which the external optical fiber scans the surface and analyzes the difference in reflectivity of glass (embedded fiber) and composite material, which displays a "signature" from which the location of the embedded optical fiber can be revealed. This "signature" may be a smoother and more uniform reflection profile when mapping the area of the optical fiber than when mapping in the composite surface. A peak of reflection intensity may also be obtained at the edge between the composite and the optical fiber, and if the optical fiber comprises a FBG a reflection peak in the center, allowing fine alignment. In any case, the large step size of a coarse alignment makes this option faster.

Once alignment is performed, the method comprises the steps of providing 305 optical material in the gap between both optical fibers and obtaining 306 an intermediate waveguide by forming a SWW. The gap may be approximately 50 microns. A small blob of material of 50 or 60 microns of diameter may be provided, the present disclosure not being limited thereto. In some embodiments, the optical material may cover the end-faces of the optical fiber, and may extend over the sides of the external optical fiber, and/or over any reinforcement structure (e.g. a ferrule). The material may extend over the wall of the composite. The optical fibers may be brought to contact for a reference measurement, then separated at the distance required for the intermediate optical material, and then obtaining 306 an intermediate waveguide. Writing the waveguide may comprise introducing an UV signal in the optical material via the external optical fiber such as a 405 nm laser signal, thereby forming the core of the SWW. Writing the waveguide may further comprise UV flooding the surface of the optical material, thereby forming the cladding of the SWW. This curing step may be tailored, so the optical index in the core is known and different from the index in the cladding. The difference of optical indices influences the MFD. Thus, the SWW may be tailored for a certain gradient of MFD and transition. Typically, maximum transmission between the external optical fiber and the embedded optical fiber is desired, but other applications may aim at lower transmissions.

An additional layer of optical material, or adhesive, may be provided to cover the intermediate waveguide and provide mechanical stability. Mechanical effects, such as variations of volume due to heating during the UV curing, are prejudicial for the very sensitive alignment between the optical fibers, but these effects may be counteracted by the use of a base plate, such as a carbon or composite removable base plate, which provides mechanical and thermal stability. Providing an additional layer of optical material or a base plate may be done sequentially or simultaneously with the step of aligning 304 the optical fibers. For example, SWW may be obtained while monitoring in reflection the alignment (e.g. by observing the grating spectra). Monitoring also provides information regarding the curing process.

Other reinforcements can be applied. For example, the external optical fiber (e.g. the pigtail fiber) may comprise a ferrule, which provides resilience to the connection during manufacture and use, even in an ultrathin foil embedding.

As an optional final step, structural reinforcement such as a housing, strain reliefs, etc. may be provided 316.

Embodiments of the present disclosure ensure an easy-to-use and reliable mechanical connection. This can for example be obtained by use of a fiber ferrule, by fixing the fiber in or on a block, a connector, a base plate or a combination of these. It ensures a more stable mechanical connection with the composite (owing to the larger diameter compared to the fiber itself). A standard, ceramic or otherwise, fiber ferrule may be used, which provides compatibility with standard connectors. This step may be performed even before obtaining the SWW, for example it may be done at the point of providing 303 the external optical fiber, so when the SWW-based optical connection is made, the pigtail optical fiber is already mounted in the ferrule.

In an embodiment, the external pigtailing fiber or external optical fiber is permanently attached to the ferrule, using a proper mechanical part as reinforcement. This mechanical reinforcement part may be applied after providing 305 optical material between the optical fibers or after obtaining 306 the SWW (e.g. by sliding it over the already attached ferrule), or may be mounted at the same time than the SWW is fabricated 306. In case of the latter, the complete assembly (ferrule and reinforcement) is then used during alignment and mounted simultaneously.

Figure 4:
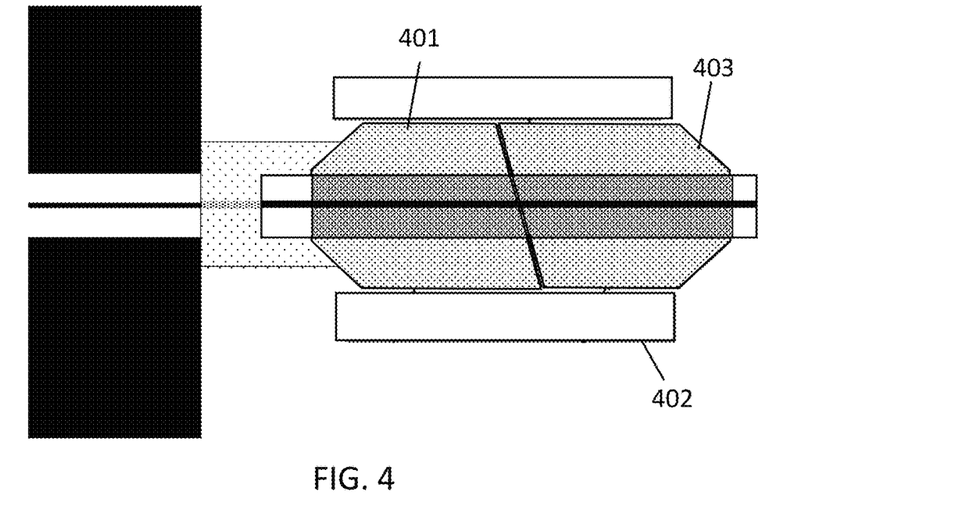
FIG. 4 illustrates a connection comprising a temporary removable sleeve/connector for a connection between an embedded optical fiber and an external optical fiber, comprising ferrules, according to an example embodiment.
Figure 5:
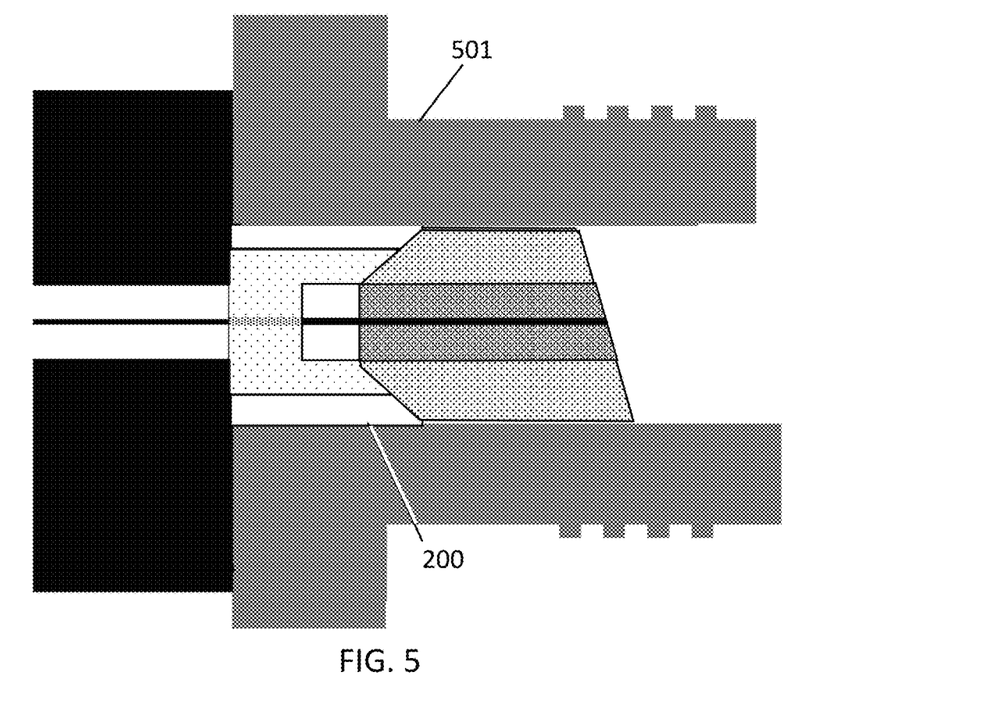
FIG. 5 illustrates the final connection comprising a connector housing, according to an example embodiment.

In a further embodiment, with reference to FIG. 4 and FIG. 5, the external pigtailing optical fiber/ferrule assembly 401 is mounted in a sleeve or holder 402 during the connectorizing process in such a way that the holder 402 can still be removed and, for example, replaced by a different connector (e.g. standard FC/APC). In some embodiments, the holder 402 is replaced by the final connector housing and everything is mounted as a complete assembly. After the process, the removable ferrule 403 can be disconnected and replaced by the desired fiber patch cord.

The method may comprise further steps, such as removing the detachable ferrule 403 not fixed to the SWW and the temporary connector 402 (if such devices were used during the previous steps), providing a connection housing, which may include providing a holder for the SWW material, providing a strain relief fixation for reducing bending and strain on the pigtail optical fiber and/or the external optical fiber, and/or adding a cable fixation structure and a dust cover. FIG. 5 shows a finalized connection comprising a housing 501, which may have been provided after removal of the holder 402 and the removable ferrule 403.

In some embodiments of the present disclosure exists the possibility of coupling two different types of optical fibers with very low losses.

Figure 6:
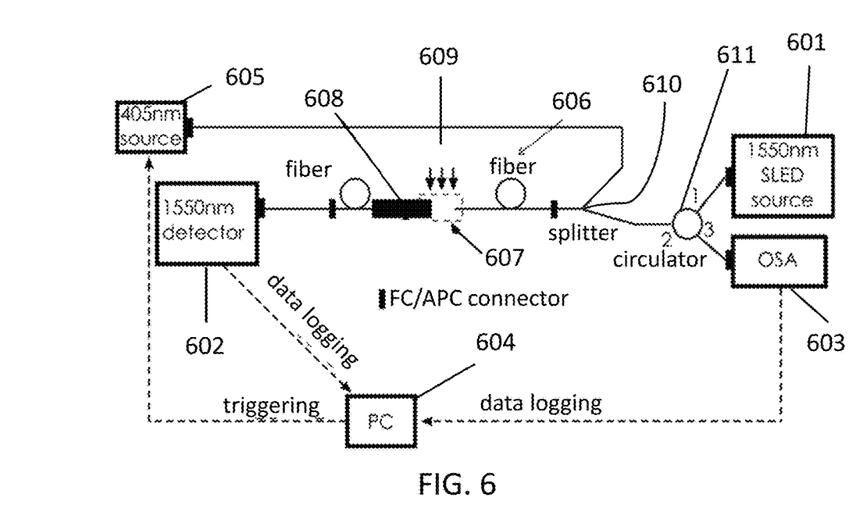
FIG. 6 illustrates a setup for providing the connection between two optical fibers, one of which being embedded, according to example embodiments.

An example of setup is shown in FIG. 6, for monitoring optical coupling loss in real-time during the connection process. A monitoring source 601 and one or two detectors 602, 603 may be used. For example, a superluminescent LED (SLED) may be a suitable monitoring source 601, and the detectors, a photodiode 602 and an Optical Spectrum Analyzer (OSA) 603, can used in transmission, but other detectors and sources may be used. The SLED and OSA can be substituted by other detectors if the alignment is performed in reflection. For example, a fiber interrogator may be used. The setup is controlled by a processing unit 604 such as a computer, which may also control triggering of the source 605, for example a 405 nm laser source, allowing precise and automatic data acquisition which facilitates process optimization. The pigtailing fiber 606 is provided, which may be the same material as the embedded fiber or a different material and may be the same or different type of fiber. Between the pigtail 606 and the composite embedded fiber 608, optical material 607 is provided and alignment can be done. The 405 nm source may be introduced in the fiber upon alignment, and a cladding may be formed on the optical material 607 via UV flood 609. Further optical components shown are a splitter 610 and a circulator 611.

As explained with reference to FIG. 3 and FIG. 4, the fiber tips may at this point slightly stick out of the ferrule. This facilitates initial tests, but is not essential and other configurations may be used, such as a standard polished fiber-ferrule assembly. If no fiber sticks out, the connection may present improved mechanical resilience, e.g. similar to commercial assemblies in which the fiber is not sticking out.

An embodiment of the method of the present disclosure may comprise the following procedure:
1. Perform coarse alignment between the embedded and external fibers.
2. Set the embedded and external fibers at the separation for the required SWW length.
3. Dispense optical material, for example an optical adhesive such as NOA68, between the 2 fiber tips, thereby covering the end-faces.
4. Bring fibers into contact and perform a reference measurement.
5. Set fibers at the separation for the required SWW length and optimize alignment.
6. Start SWW writing process, e.g. simultaneously activating 405 nm laser radiation through the external fiber and flood-UV exposure to form the cladding.

The insertion loss is measured continuously during the course of the experiment. This serves as a direct feedback for the success of the connection process and gives insight on the SWW formation process. In such a way, parameter optimization becomes also easier. Alternatively or in addition thereto also the signal in reflection could be employed as a figure of merit, in case the embedded fiber has no connector.

Figure 7:
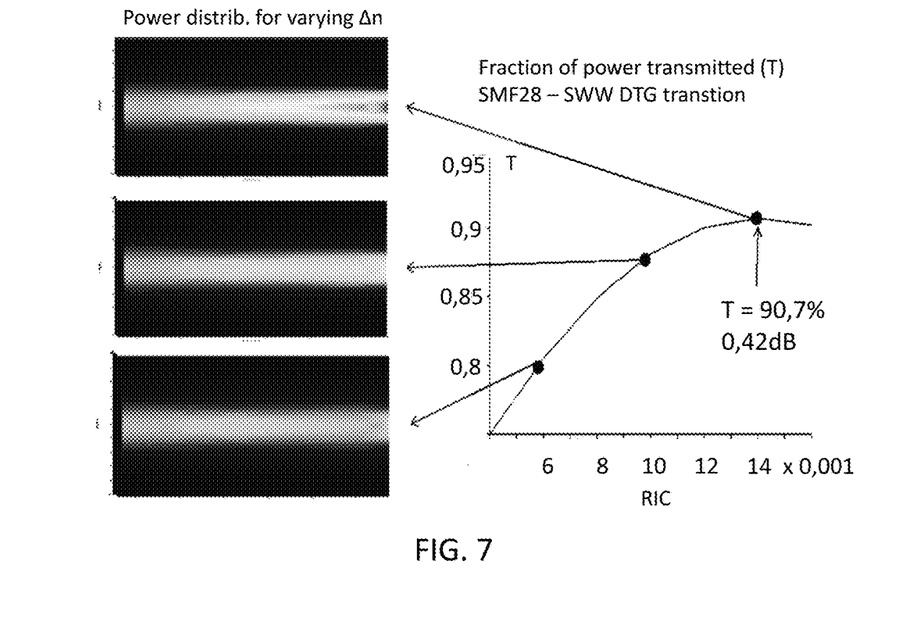
FIG. 7 illustrates a simulation of the fraction of transmitted power in a SWW section, according to an example embodiment.

In an example of method of the present disclosure, an embedded commercial fiber sensor can be coupled to a commercial telecommunication fiber. For example, the embedded fiber may be a DTG 1550-125, optimized for 1550 nm wavelength window, and with a diameter of 125 microns, a core index of 1.459 and a refractive index contrast (RIC) of 0.015 (MC represents the difference of optical indices between the core and the cladding). The telecommunication fiber may be e.g. an SMF-28 fiber with a core index of 1.473 and MC of 0.005. Use of SWW according to embodiments of the present disclosure brings better coupling performance than direct "DTG/SMF-28 splice" method. In some embodiments, the MFD of the DTG-SWW interface and the SWW-SMF-28 interface may be selected to be as close as possible. Since mode field diameters in DTG and SMF28 fibers are clearly different (~6 microns compared to ~10.4 microns respectively), the SWW will need some sort of average MFD of both fibers. In an example embodiment, ideal parameters may include, for example, a RIC between 0.01 and 0.015 and an MFD of 8 microns. In this case it acts as an MFD-converter, gradually adapting the MFD when the optical mode travels through the connection. This justifies the better performance which can be obtained compared to a fusion splice. FIG. 7 shows a simulation of the fraction of transmitted power T for different RIC values through a SMF-28/SWW/DTG transition, representing the "mode size-converting" behaviour of a SWW section. Because RIC represents the difference between core and cladding optical indices, different values may be obtained for different curing types and curing times. If the MC in the SWW is similar to that in the SMF-28 fiber (bottom power distribution plot in FIG. 7), the MFD of a mode propagating from the SMF-28 fiber side presents only a small variation. When the RIC is increased, the maximum value of the power (in the center of the waveguide/fiber) is increased. The total power is conserved; thus the MFD is reduced (higher mode peak power). The minimum achievable loss for this specific simulation case is about 0.42 dB. It is possible that a more optimized MC profile of the SWW may still reduce this value. For example, a gradual change in MC will likely reduce the loss, but this is more difficult to obtain in practice. The loss between an SMF-28 fiber—(uncured NOA68)—DTG fiber at nearly 0 micron separation was simulated to be about 0.9 dB, which is similar to the expected splice losses.

In prior techniques, if the connection breaks, the embedding fiber may be lost, impeding any chance of reparation, or if reparation is possible, very complex and even destructive methods may be necessary. The present method offers the advantage that, in case of damage or loss of the connection, it can be easily repaired by repeating alignment and providing the intermediate WG. At most, a slight polishing of the surface may be needed.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. An optical system comprising:
   an embedded optical fiber embedded in an embedding material and having a first optical index, wherein the embedded optical fiber comprises side walls extending in a longitudinal direction in contact with the embedding material;
   an external optical fiber having a second optical index; and
   a self-written waveguide in optical contact with the embedded optical fiber and the external optical fiber thus forming an optical connection between the embedded optical fiber and the external optical fiber,
   wherein a optical index of the self-written waveguide is an average of the first optical index and the second optical index,
   wherein only an end-face perpendicular to the side walls of the embedded optical fiber is outside the embedding material, in contact with the self-written waveguide, and
   wherein a mode field diameter of the embedded optical fiber is different from a mode field diameter of the external optical fiber, and wherein the external optical fiber is configured to provide a connection to a sensor reader.

2. The optical system of claim 1, wherein the embedding material is a composite.

3. The optical system of claim 1, wherein the embedded optical fiber comprises a first fiber core and wherein the external optical fiber comprises a second fiber core.

4. The optical system of claim 3, wherein the first fiber core and the second fiber core are optically aligned, and wherein a diameter of the first fiber core is different from a diameter of the second fiber core.

5. The optical system of claim 1, wherein the self-written waveguide comprises a core and a cladding.

6. The optical system of claim 1, further comprising a strain relief fixation configured to reduce bending and strain on the external optical fiber.

7. The optical system of claim 1, further comprising a ferrule, a block, a connector, a base plate, or a combination thereof attached to the self-written waveguide.

8. The optical system of claim 7, wherein the ferrule is adapted to cooperate with an external ferrule of a removable optical fiber to thereby provide optical contact between the external optical fiber and the removable optical fiber.

9. The optical system of claim 8, wherein both ferrules have an angled termination.

10. The optical system of claim 1, wherein the embedded optical fiber and the external optical fiber are single mode optical fibers.

11. The optical system of claim 1, wherein the self-written waveguide is located between the embedded optical fiber and the external optical fiber.

12. A method for optically coupling the external optical fiber with the embedded optical fiber embedded in the embedding material, thereby obtaining an optical system of claim 1, the method comprising:
    exposing an end-face of the embedded optical fiber without exposing the side walls of the embedded optical fiber out of the embedding material;
    aligning an end-face of the external optical fiber with the exposed end-face of the embedded optical fiber; and
    providing an optical intermediate waveguide material between the end-face of the embedded optical fiber and the end-face of the external optical fiber, thereby obtaining the self-written waveguide between the embedded optical fiber and the external optical fiber.

13. The method of claim 12, wherein aligning the end-faces of the respective optical fibers comprises transmitting a signal through the external optical fiber and measuring a difference in reflectivity between the end-face of the embedded optical fiber and the embedding material, thus revealing a location of the embedded optical fiber.

14. The method of claim 12, wherein obtaining the self-written waveguide comprises the steps of dispensing an optical polymer between the end-face of the embedded optical fiber and the end-face of the external optical fiber, forming a core of the self-written waveguide, and forming a cladding of the self-written waveguide.

15. The method of claim 14, wherein forming the core of the self-written waveguide comprises transmitting a UV signal through the respective optical fibers, and wherein forming the cladding comprises applying flood UV exposure to the optical polymer.

16. The method of claim 12, wherein alignment is performed with support of a base plate.

17. The method of claim 12, further comprising a ferrule for facilitating connection with an external sensor, an external reader, or an external fiber.

18. The method of claim 12, further comprising providing structural reinforcement.

19. The method of claim 18, wherein the structural reinforcement comprises a strain relief element.

* * * * *